US008826342B2

(12) United States Patent
LaRosa et al.

(10) Patent No.: US 8,826,342 B2
(45) Date of Patent: Sep. 2, 2014

(54) PROGRAMMABLE, INTERACTIVE CONTENT VIEWING ON A MOBILE VIDEO APPLICATION

(75) Inventors: Christopher LaRosa, San Francisco, CA (US); Horia Ciurdar, London (GB); Andrey Doronichev, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/349,205

(22) Filed: Jan. 12, 2012

(65) Prior Publication Data

US 2012/0185902 A1 Jul. 19, 2012

Related U.S. Application Data

(60) Provisional application No. 61/432,196, filed on Jan. 12, 2011.

(51) Int. Cl.

| H04N 7/16 | (2011.01) |
|---|---|
| H04N 21/414 | (2011.01) |
| H04N 21/433 | (2011.01) |
| H04N 21/6543 | (2011.01) |
| H04N 21/458 | (2011.01) |
| H04N 21/4782 | (2011.01) |
| H04N 21/81 | (2011.01) |

(52) U.S. Cl.
CPC ..... *H04N 21/41407* (2013.01); *H04N 21/4331* (2013.01); *H04N 21/6543* (2013.01); *H04N 21/458* (2013.01); *H04N 21/4782* (2013.01); *H04N 21/812* (2013.01)
USPC .......................................................... 725/62

(58) Field of Classification Search
None
See application file for complete search history.

(56) References Cited

U.S. PATENT DOCUMENTS

| 8,037,491 | B2 * | 10/2011 | Yamazaki et al. ............... 725/31 |
|---|---|---|---|
| 8,359,622 | B1 * | 1/2013 | Everson et al. ............... 725/114 |
| 2002/0092026 | A1 * | 7/2002 | Janniello et al. ................ 725/86 |
| 2006/0150070 | A1 | 7/2006 | Korhonen et al. |
| 2008/0083003 | A1 | 4/2008 | Biniak et al. |
| 2008/0120657 | A1 * | 5/2008 | Dong .............................. 725/82 |
| 2008/0276269 | A1 * | 11/2008 | Miller et al. .................... 725/34 |
| 2009/0018917 | A1 | 1/2009 | Chapman et al. |
| 2009/0172727 | A1 * | 7/2009 | Baluja et al. ................... 725/34 |
| 2010/0023397 | A1 * | 1/2010 | Goldman et al. .......... 705/14.48 |

OTHER PUBLICATIONS

PCT International Search Report and Written Opinion, PCT Application No. PCT/US2012/021091, Aug. 29, 2012, 8 pages.

* cited by examiner

*Primary Examiner* — Chenea Smith
(74) *Attorney, Agent, or Firm* — Fenwick & West LLP (57) ABSTRACT

Promotional content provided by content providers is distributed to mobile devices to be displayed with designated videos on mobile devices. The promotional content is received from a content provider, e.g., via an API and associated with a video, group of videos or channel available from a video hosting server. The promotional content meets certain specifications set by the video hosting server. A mobile device requests promotional content for a selected video and the video hosting server provides any available promotional content to the mobile device. The promotional content is displayed with the selected video as designated by the content provider. Activation of the promotional content in some embodiments results in an action being invoked on the mobile device, such as loading of a uniform resource identifier. In some cases, the promotional content is cached by the mobile device for later use.

23 Claims, 5 Drawing Sheets

PROGRAMMABLE, INTERACTIVE CONTENT VIEWING ON A MOBILE VIDEO APPLICATION

CROSS-REFERENCE TO RELATED APPLICATION

This application claims the benefit of U.S. Provisional Application No. 61/432,196, filed Jan. 12, 2011, which is hereby incorporated by reference in its entirety.

FIELD OF DISCLOSURE

Disclosed embodiments generally relate to displaying branded content through a mobile user interface. In particular, the disclosure is directed toward displaying branding information in association with content on a mobile device, the branding designated by the provider of the content.

BACKGROUND

Some video hosting sites allow viewers to view videos by visiting a watch page on the video hosting site or by using a customized client application. Some viewers use personal computers to access videos on the video hosting sites, while others use mobile devices.

Displaying effective promotional content on mobile devices has proven more challenging than on conventional desktop or laptop PCs due to the limited display area available on a mobile device.

SUMMARY

Promotional content provided by content providers is distributed to mobile devices to be displayed with designated videos on mobile devices. The promotional content is received from a content provider, e.g., via an application programming interface (API) and associated with a video, group of videos or channel available from a video hosting server. The promotional content meets certain specifications set by the video hosting server. A mobile device requests promotional content for a selected video and the video hosting server provides any available promotional content to the mobile device. The promotional content is displayed with the selected video by the mobile device as designated by the content provider. Activation of the promotional content in some embodiments results in an action being invoked on the mobile device, such as loading of a uniform resource identifier. In some cases, the promotional content is cached by the mobile device for later use.

DETAILED DESCRIPTION

Figure 1:
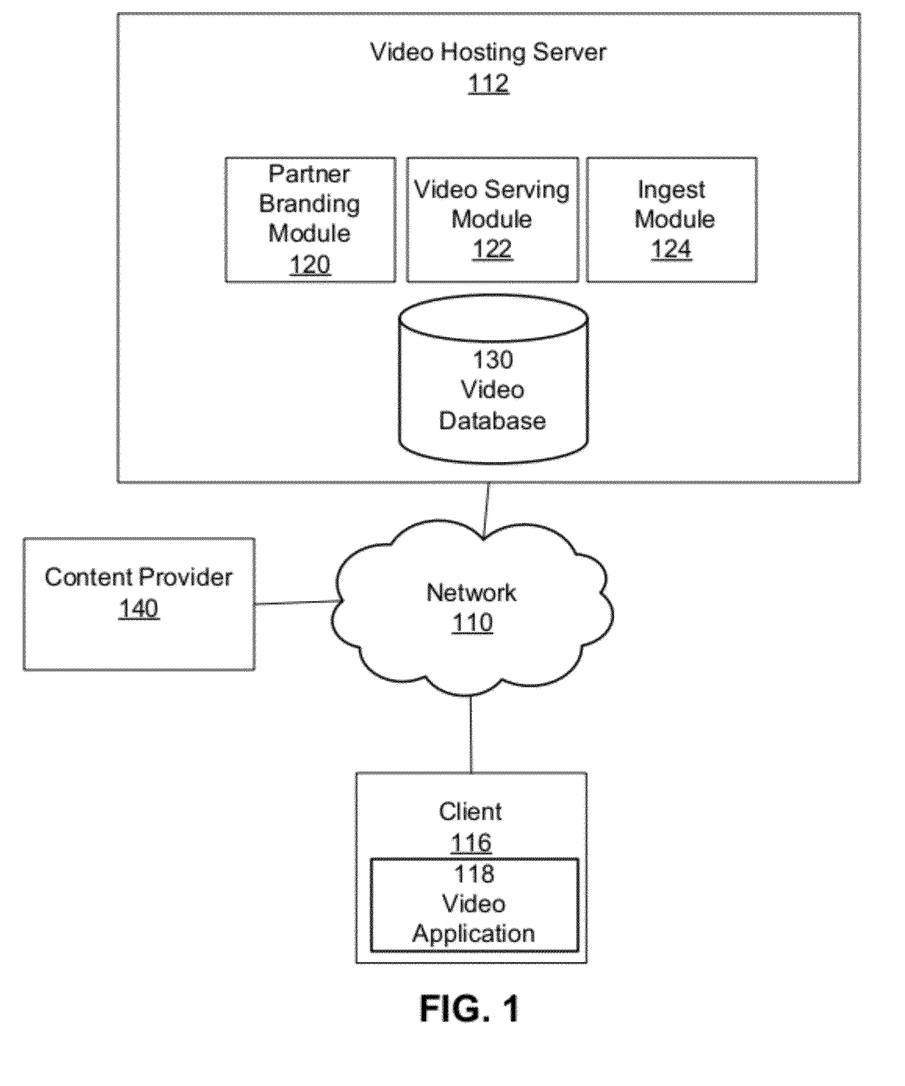
FIG. 1 is a block diagram of the system architecture according to one embodiment.

Referring now to FIG. 1, there is shown a system architecture of a video hosting server 112 in accordance with one embodiment. As shown in FIG. 1, the video hosting server 112 includes a partner branding module 120, a video serving module 122, an ingest module 124, and a video database 130. Many conventional features, such as firewalls, load balancers, application servers, failover servers, site management tools and so forth are not shown so as not to obscure the features of the system. In general, functions described in one embodiment as being performed on the server side can also be performed on the client side in other embodiments if appropriate. In addition, the functionality attributed to a particular component can be performed by different or multiple components operating together.

The server is implemented as a server program executing on server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media).

A client 116 executes a video application 118 to view digital content items and can connect to the video hosting server 112 via a network 110, which is typically the Internet, but can also be any network, including but not limited to any combination of a LAN, a MAN, a WAN, a mobile, wire or wireless network, a private network, or a virtual private network. While only a single client 116 is shown, it is understood that very large numbers (e.g., millions) of clients are supported and can be in communication with the video hosting server 112 at any time. The client 116 may include a variety of different computing devices. Examples of client devices 116 are personal computers, digital assistants, personal digital assistants, cellular phones (including smart phones), and laptop computers. We assume for the remainder of this disclosure that client 116 is a mobile phone, though other devices as described above may be used in alternative embodiments as will be apparent to those of skill in the art. Many suitable mobile devices from multiple manufacturers exist. One example of a mobile device includes the Nexus S by Google, Inc. of Mountain View, Calif. Client device 116 typically includes an operating system, for example the Android operating system also by Google, Inc.

The video application 118 is executed by or as part of the operating system of client device 116. The video application 118 allows users of client 116 to access video information and view videos from a remote server. In various embodiments, the video application 118 allows a user to access a video from the video hosting server 112 by browsing a catalog of videos, conducting searches on keywords, reviewing play lists from other users or the system administrator (e.g., collections of videos forming channels), or viewing videos associated with particular user groups. One suitable application is the YouTube Android 2.0 application provided by Google, Inc.

A content provider 140 is an entity that owns or controls at least some of the rights to a particular work. The content provider 140 may be an individual, a group of individuals, or an entity such as a music or video production company, studio, record label or artists' group. The content provider 140 provides digital content items to the video hosting server 112 via the network 110. The content provider 140 determines digital content items that should be uploaded to the video hosting server 112. While only one content provider 140 is shown, it is understood that any number of content providers are supported and can be in communication with the video hosting server 112 at any time. Additionally, content provider 140 may be referred to below as a "partner." A content provider 140 that provides digital content to the video hosting server 112 through ingest module 124 can designate an owner of the uploaded digital content. A content provider 140 can also be designated an owner of content that was uploaded by another content provider 140. In one embodiment, the content provider 140 submits a request, or claims, that it is the owner of certain uploaded digital content. The validity of this claim can be reviewed by the video hosting server 112 or the operator of the video hosting server 112. Alternatively, claims can be automatically initially accepted for some or all content providers 140. Digital content determined to be owned by a content provider is referred to as claimed content.

The uploaded digital content items can include, for example, video, audio or a combination of video and audio. Alternatively, a digital content item may be a still image, such as a JPEG or GIF file or a text file. For purposes of convenience and the description of one embodiment, the uploaded digital content items will be referred to as a "video," "video files," or "video items," but no limitation on the type of digital content items that can be uploaded are indented by this terminology. Thus, the operations described herein can be applied to any type of digital content, not only videos; other suitable types of digital content items include audio files (e.g. music, podcasts, audio books, and the like), documents, websites, images, multimedia presentations, and so forth.

In one embodiment, upon receiving a request from the user to display video information associated with a video, the video application 118 communicates with the partner branding module 120 to determine whether the video has been claimed by a content provider. If the video has been claimed by a partner, the video application 118 attempts to display branding that has been uploaded by the partner. In one embodiment, branding information uploaded by a partner is designated to be displayed with all claimed content that is associated with a certain channel. However, branding may also be designated to be displayed with individual videos, videos with music by a certain artist, content claimed by the partner across multiple channels and other configurable subsets of videos claimed by the partner. This branding information is retrieved by the video application 118 when displaying a claimed video. In one embodiment, branding information can be cached on a client 116 after initial use by the video application 118.

Figure 2:
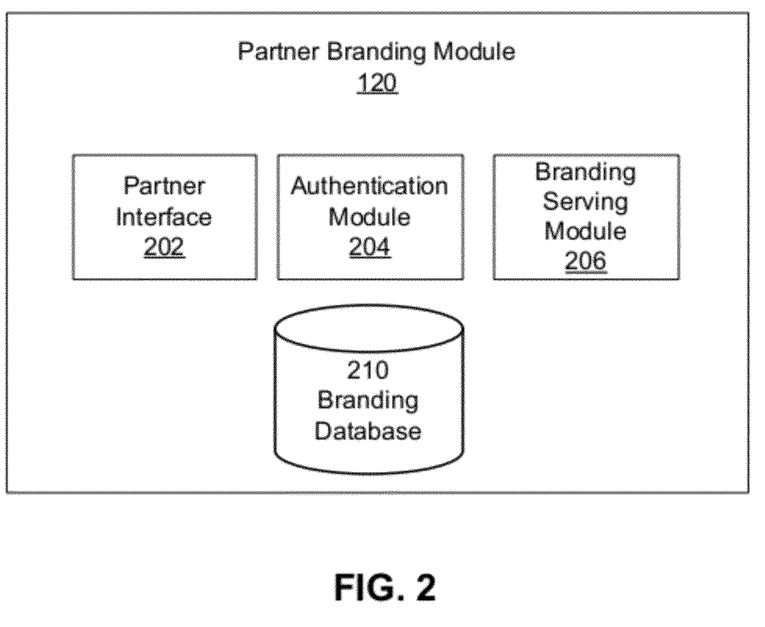
FIG. 2 is a block diagram of a partner branding module shown according to one embodiment.

FIG. 2 is a block diagram of a partner branding module 120 in accordance with one embodiment. Partner branding module 120 includes a partner interface 202, an authentication module 204, a branding serving module 206 and a branding database 210. The partner interface 202 provides a portal through which content providers 140 can upload branding information. The partner interface 202 includes an API through which content providers 140 interface with the video hosting server 112. The API enables content providers 140 to update branding information and upload promotional content to the branding database 210. The API also allows a content provider to set and view branding settings for channels and videos that contain content claimed by the content provider. The branding information is stored in branding database 210. In one embodiment, for the branding information to be uploaded, the content provider must be designated as a branding-enabled partner. In one embodiment, partner interface 202 provides a template or publishes requirements for the appearance and formatting of branding information. Upon receiving valid branding information, the branding information is stored in the branding database 210.

As part of the process for displaying a video on client device 116, video application 118 requests video information from video hosting server 112. This information can also, in some embodiments, be cached locally on the client 116 for recently viewed videos. In one embodiment, all requests from the video application 118 are signed with a device-specific key requested from the video hosting server 112, for example at the first startup of the video application 118. The video hosting server 112 generates the device-specific key based on a client specific key and device ID submitted by the video application 118. Authentication is useful to prevent unauthorized access to the branding information supplied by a content provider 140. Various methods for authenticating a client device are known in the art, and any suitable one may be employed here. The video hosting server 112 responds to authorized clients with video information including metadata indicating whether the video has been claimed by a content provider 140. If the video is claimed, the client 116 then requests branding information from branding serving module 206 to display branding with the video. Branding information may or may not be available for a claimed video. The branding information can also be cached locally on the client 116 for recently viewed videos. Branding information is retrieved from the branding database 210 and returned to the video application 118 by the branding serving module 206. Branding information can include promotional content or a uniform resource locator (URL) where promotional content can be retrieved for display. Branding information returned to video application 118 can also indicate that no branding is available for the specified video.

Figure 3:
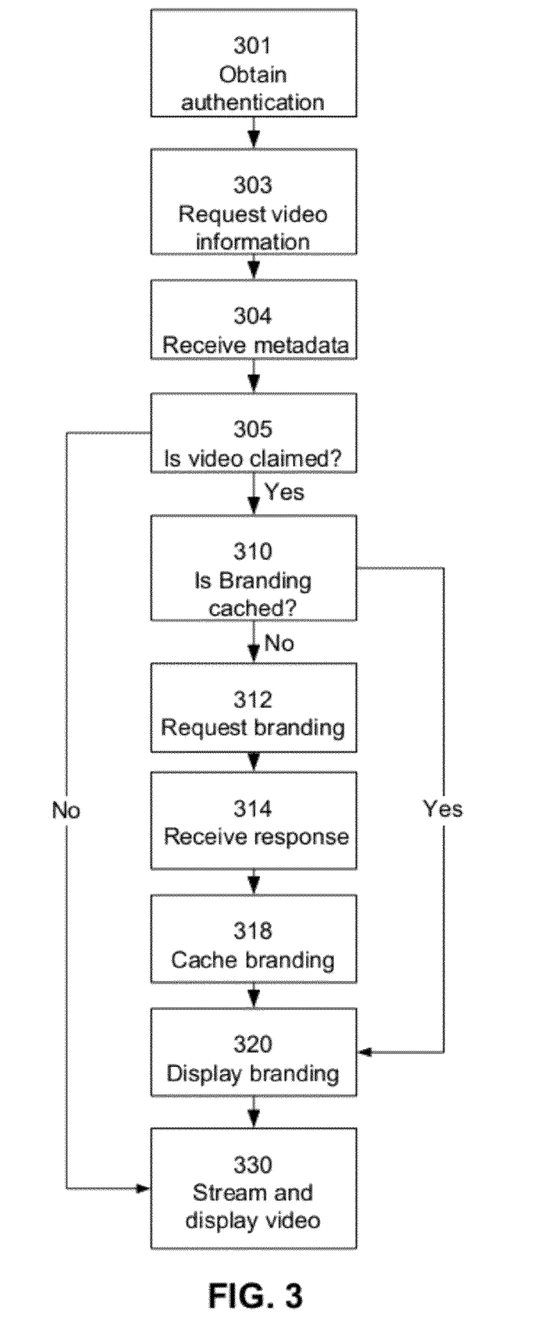
FIG. 3 is a flow chart illustrating a method for obtaining branding information associated with a video on a mobile device according to one embodiment.

FIG. 3 is a flow chart illustrating a method for obtaining branding information associated with a video on a mobile device in accordance with one embodiment. In one embodiment, video application 118 is authenticated 301 by the video hosting server 112. The video application 118 submits an encrypted key or other identifying information in order to obtain 301 authentication. The video application 118 then requests 303 information associated with a video. The video application receives 304 metadata associated with the specified video and analyzes the metadata to determine 305 whether the video is claimed by a content provider 140. If the video is not claimed, the video application 118 can assume no branding information is stored in the branding database 210. In response, video application 118 streams and displays 330 the video without accompanying branding. In another embodiment, branding may be available for all videos regardless of whether they are claimed. If the video is claimed, the video application 118 determines 310 if the branding information for the selected video has been cached due to a recent access of the video or expected access of the video. If the branding was cached, the branding is displayed 320 and the video is displayed 330 alongside the branding. If not, the video application 118 requests 312 branding information associated with the video from the branding serving module 206 on the video hosting server 112. The video application 118 then receives 314 the requested branding information from the branding serving module 206. The branding information is then cached 318 for later use and branding is displayed 320 as part of the video application 118. The video is streamed and displayed as part of the video application 118 with associated branding.

Figure 4:
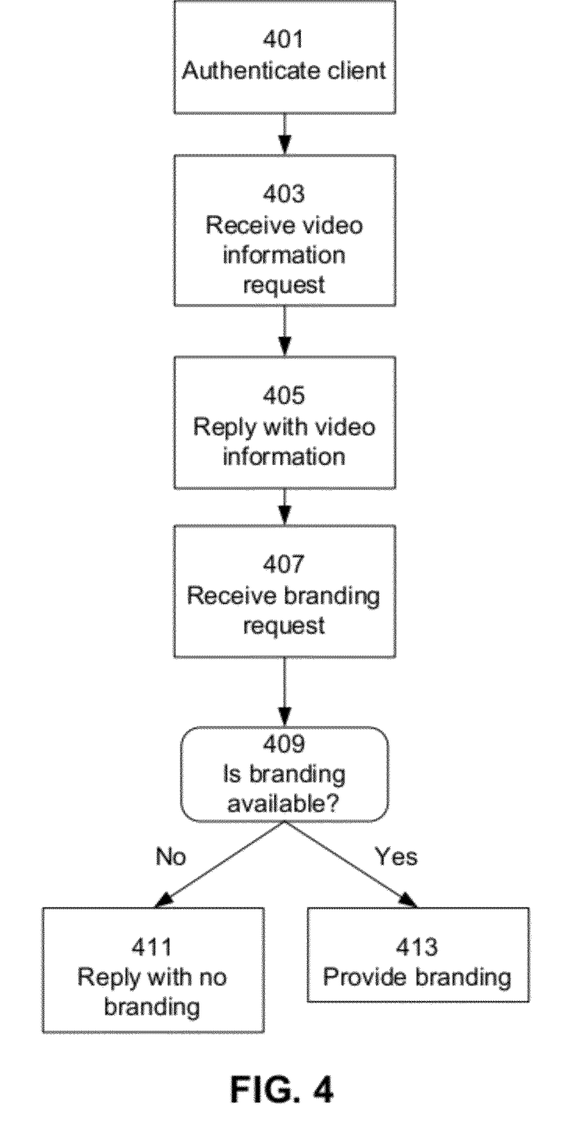
FIG. 4 illustrates a method for providing branding information associated with mobile video content according to one embodiment.

FIG. 4 illustrates a method for providing branding information associated with mobile video content in accordance with an embodiment. Initially, a client 116 contacts the video hosting server in order to authenticate 401 the video application 118 on the client. A request for video information 403 associated with a video is then received from the video application 118. The video serving module 122 retrieves the requested video information from the video database 130 and replies 405 to the video application 118 with the video information. In one embodiment, the video information includes metadata that specifies whether the video has been claimed. The branding serving module 206 may then receive a branding request for the video from the video application 118. In response, the branding serving module 206 queries the branding database 210 to determine 409 if branding for the video is available. If it is, the branding serving module 206 provides 413 the branding information to the video application 118. If no branding is available for the video, the branding serving module 206 informs 411 the video application 118 that no branding is available.

Figure 5:
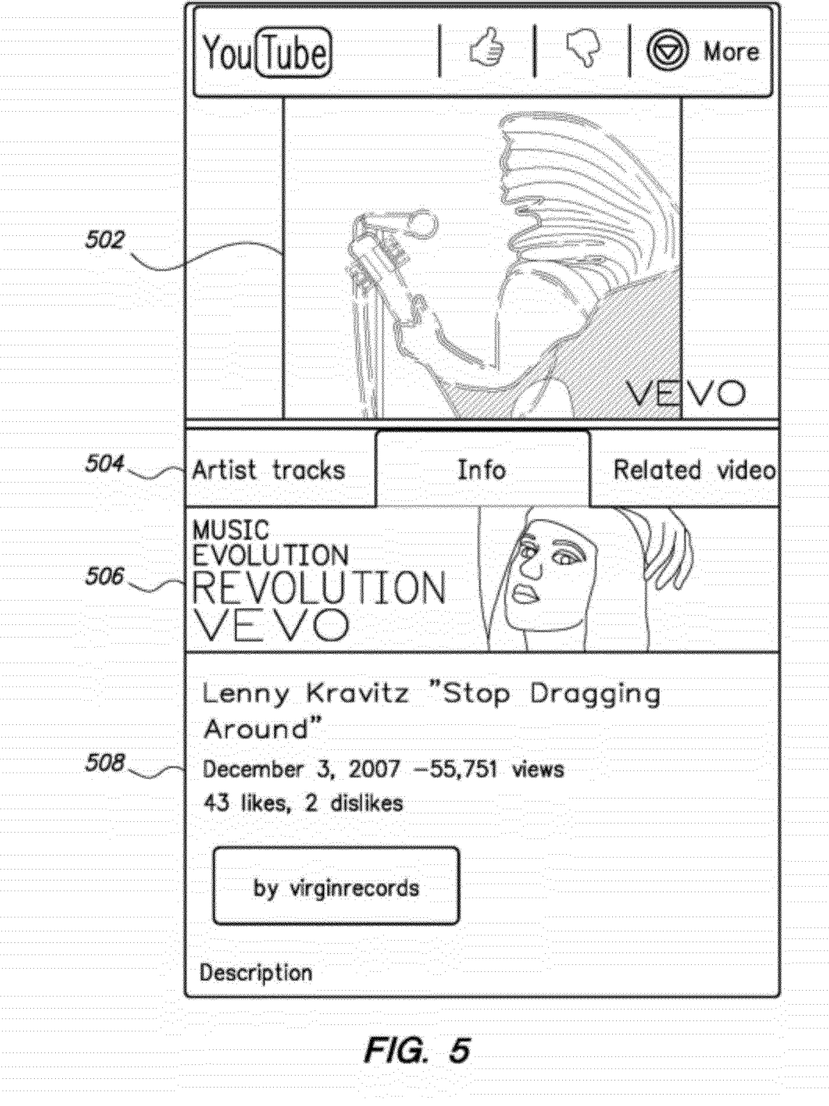
FIG. 5 illustrates an example of branding in a video application according to one embodiment.

FIG. 5 illustrates an example of branded promotional content 506 in a screen of the video application 118 to be displayed on the client 116. The current video 502 is shown in one region of the screen—the upper portion in this example. As shown, the branding 506 is an interactive image displayed between the video information area 508 and information tabs 504. The information tabs 504 allow the user to view a certain category of information related to the current video. The video information area 508 displays the information that falls under the selected information tab 504. In alternate embodiments, branding can be displayed anywhere on a screen of video application 118. The branding may also be displayed in various sizes and formats, such as video.

A viewer of a video and branding information on client device 116 may perform various actions to interact with the branding information. In one embodiment, tapping, clicking, or other activation of the branding region launches a web browser on client 116 and causes the browser to display a website associated with the branded promotional content 506 and/or the current video. Interaction with the branded promotional content 506 may also invoke an operating system level function such as opening another application. For example, branded promotional content 506 may include an instruction to launch another application and to execute a specified command in that application (a process referred to, e.g., in the Android operating system, as an intent). An intent is a data structure containing a description of a to-be-performed operation. In one embodiment, if the branded promotional content 506 is selected, an intent is passed to the Android operating system. Similar implementations are possible with other operating systems. In one embodiment, the state of video application 118 is saved before exiting due to a branding interaction. This allows the user to interact with promotional content without losing information such as the playback position of the video at the time the interaction took place.

In another embodiment, interaction with branded promotional content 506 does not otherwise affect the operation of video application 118 or the playback of current video 502. For example, the branded promotional content 506 may be an interactive game that is related to a product. The branded promotional content 506 could also interactively provide further information about a product, e.g., by sending an e-mail to the viewer, or by adding a video related to the promotional content to the viewer's playlist.

The accompanying figures further illustrate the concepts described above. The features and advantages described in the specification are not all inclusive and, in particular, many additional features and advantages will be apparent to one of ordinary skill in the art in view of the drawings, specification, and claims.

Within this written description, the particular naming of the components, capitalization of terms, the attributes, data structures, or any other programming or structural aspect is not mandatory or significant, and the implementing mechanisms or features described may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs executed by one or more processors. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for providing promotional content to a mobile device, the method comprising:
    storing, by a video hosting server, a video claimed by a content provider;
    storing, by the video hosting server, a promotional content item provided by the content provider;
    responsive to a user requesting the video from a mobile device, receiving, by the video hosting server from the mobile device, a request for video information associated with the video;
    providing, by the video hosting server to the mobile device, video information indicating whether a content provider has claimed ownership of the video, the mobile device determining to display promotional content with the video based on the video information indicating that a content provider has claimed ownership of the video;
    responsive to the mobile device determining to display promotional content, receiving, by the video hosting server, a request for an item of promotional content;
    providing, by the video hosting server, a promotional content item to the mobile device; and
    providing, by the video hosting server, the video to the mobile device, the promotional content item displayed on the mobile device with the video.

2. The method of claim 1, wherein the promotional content item is provided to the mobile device responsive to the mobile device being authenticated as an authorized client.

3. The method of claim 1, wherein receiving a request for video information from the mobile device further comprises receiving a request for promotional content associated with the video from the mobile device.

4. The method of claim 1, wherein the promotional content item includes a mobile device instruction, the mobile device instruction when executed causing the mobile device to invoke an operating system level function that launches a mobile application.

5. The method of claim 1, wherein the promotional content item is a branded image or video.

6. A computer system for providing promotional content to a mobile device, the system comprising a non-transitory computer readable medium storing instructions for:
    storing, by a video hosting server, a video claimed by a content provider;
    storing, by the video hosting server, a promotional content item provided by the content provider;
    responsive to a user requesting the video from a mobile device, receiving, by the video hosting server from the mobile device, a request for video information associated with the video;
    providing, by the video hosting server to the mobile device, video information indicating whether a content provider has claimed ownership of the video, the mobile device determining to display promotional content with the video based on the video information indicating that a content provider has claimed ownership of the video;
    responsive to the mobile device determining to display promotional content, receiving, by the video hosting server, a request for an item of promotional content;
    providing, by the video hosting server, a promotional content item to the mobile device; and
    providing, by the video hosting server, the video to the mobile device, the promotional content item displayed on the mobile device with the video.

7. The computer system of claim 6, wherein the promotional content item is provided to the mobile device responsive to the mobile device being authenticated as an authorized client.

8. The computer system of claim 6, wherein receiving a request for video information from the mobile device further comprises receiving a request for promotional content associated with the video from the mobile device.

9. The computer system of claim 6, wherein the promotional content item includes a mobile device instruction, the mobile device instruction when executed causing the mobile device to invoke an operating system level function that launches a mobile application.

10. The computer system of claim 6, wherein the promotional content item is a branded image or video.

11. A computer-implemented method for receiving promotional content at a mobile device, the method comprising:
    authenticating a mobile device with a video hosting server;
    receiving, by the mobile device, a request from a user for a video, the video stored at the video hosting server;
    requesting, by the mobile device from the video hosting server, video information associated with the video;
    receiving, by the mobile device from the video hosting server, video information indicating whether a content provider has claimed ownership of the video;
    determining, by the mobile device, to display promotional content with the video responsive to the video information indicating that a content provider has claimed ownership of the video;
    responsive to determining to display promotional content with the video, requesting, by the mobile device from the video hosting server, an item of promotional content;
    receiving, by the mobile device, a promotional content item; and
    displaying, by the mobile device, the received promotional content item with the video, the video received from the video hosting server.

12. The method of claim 11, wherein authenticating comprises submitting an encrypted key to the video hosting server.

13. The method of claim 11, further comprising:
caching the received promotional content item.

14. The method of claim 11, further comprising:
responsive to determining to display promotional content with the video, determining whether the promotional content item has been previously cached; and
responsive a determination that the promotional content item has been previously cached, displaying the cached promotional content item.

15. The method of claim 11, wherein the promotional content item includes a mobile device instruction, the mobile device instruction when executed causing the mobile device to invoke an operating system level function that launches a mobile application.

16. The method of claim 11, wherein the promotional content item includes a mobile device instruction comprising a uniform resource locator (URL) to be opened in a web browser on the mobile device.

17. The method of claim 11, wherein the promotional content item is a branded image or video.

18. The method of claim 1, wherein the promotional content item is provided to the mobile device responsive to the video hosting server authenticating the mobile device and the request for an item of promotional content being signed with a device-specific key.

19. The method of claim 18, wherein authenticating the mobile device comprises:
  receiving, from the mobile device, a mobile device identification;
  generating the device-specific key based on the mobile device identification; and
  providing the device-specific key to the mobile device.

20. The method of claim 17, wherein authenticating with the video hosting server comprises:
  providing a mobile device identification to the video hosting server; and
  receiving, from the video hosting server, a device-specific key generated based on the mobile device identification, every request transmitted to the video hosting server signed with the device-specific key generated.

21. The method of claim 1, wherein the promotional content item is received by the video hosting server from the content provider through an application programming interface.

22. The method of claim 1, wherein the promotional content item is displayed with all videos hosted by the video hosting server that have been claimed by the content provider.

23. The method of claim 11, wherein the promotional content item is provided by the content provider to the video hosting server through an application programming interface.

* * * * *